(12) United States Patent
Heckerman

(10) Patent No.: US 7,644,094 B2
(45) Date of Patent: *Jan. 5, 2010

(54) SYSTEM AND METHOD FOR PROCESSING A LARGE DATA SET USING A PREDICTION MODEL HAVING A FEATURE SELECTION CAPABILITY

(75) Inventor: David Earl Heckerman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 312 days.

This patent is subject to a terminal disclaimer.

(21) Appl. No.: 11/193,268

(22) Filed: Jul. 30, 2005

(65) Prior Publication Data

US 2005/0267852 A1    Dec. 1, 2005

Related U.S. Application Data

(63) Continuation of application No. 10/146,089, filed on May 14, 2002, now Pat. No. 6,963,870.

(51) Int. Cl.
*G06F 17/30* (2006.01)
(52) U.S. Cl. .............................. 707/101; 707/5; 707/100
(58) Field of Classification Search ........................ None
See application file for complete search history.

(56) References Cited

U.S. PATENT DOCUMENTS

| | | | | |
|---|---|---|---|---|
| 6,014,661 A * | 1/2000 | Ahlberg et al. .................. 707/3 |
| 6,101,325 A * | 8/2000 | Flaat ........................... 717/136 |
| 6,226,409 B1 * | 5/2001 | Cham et al. .................. 382/228 |
| 6,263,337 B1 * | 7/2001 | Fayyad et al. ................... 707/6 |
| 6,314,204 B1 * | 11/2001 | Cham et al. ................. 382/228 |
| 6,353,679 B1 * | 3/2002 | Cham et al. .................. 382/228 |
| 6,449,612 B1 * | 9/2002 | Bradley et al. ................. 707/6 |
| 6,466,929 B1 * | 10/2002 | Brown et al. .................. 706/48 |
| 6,934,748 B1 * | 8/2005 | Louviere et al. ............ 709/224 |
| 6,963,870 B2 * | 11/2005 | Heckerman .................... 707/5 |
| 6,971,063 B1 * | 11/2005 | Rappaport et al. .......... 715/733 |
| 7,051,315 B2 * | 5/2006 | Artzi et al. .................. 717/103 |
| 7,392,201 B1 * | 6/2008 | Binns et al. ..................... 705/4 |
| 2002/0087717 A1 * | 7/2002 | Artzi et al. .................. 709/236 |
| 2003/0023416 A1 * | 1/2003 | Peterson et al. ................ 703/2 |
| 2003/0217029 A1 * | 11/2003 | Heckerman .................... 707/1 |

OTHER PUBLICATIONS

Sayood, "Introduction to Data Compression", Dec 1996, Morgan Kaufman, p. 5-8, 190-203. 240-241, 260-284.*

(Continued)

*Primary Examiner*—Khanh B Pham
(74) *Attorney, Agent, or Firm*—Lyon & Harr, L.L.P.; Craig S. Fischer

(57) ABSTRACT

The present invention includes a system and a method for processing large data sets that are too large to conveniently fit into a formal database application. The large data set processing system and method use a prediction model having a feature selection capability to process a fraction of the large data set and define useful predictors. The useful features are used to make predictions for the entire data set. The large data set processing system includes a useful predictor module, for defining useful predictors, and a feature-selection prediction model, for processing a portion of the data set (including the useful predictors) to obtain prediction results.

20 Claims, 12 Drawing Sheets

OTHER PUBLICATIONS

Tang et al., "Effective Varitaion Management for Pseudo Periodical Streams", Jun. 12, 2007, ACM SIG Mod' 07, p. 257-268.*
Roth et al., "Database Compression", Sept. 1993, ACM SIGMOD, vol. 22, No. 3, p. 31-39.*
Ives et al, "Effects of Multiple-Pass Filtering in Lossless Predictive Compression of Waveform Data", Nov. 2002, IEEE Transactions on Geoscience and Remote Sensing, vol. 40, No. 11, p. 2448-2453.*
Cadez et al, "Visualization of navigation patterns on a Web site using model-based clustering", Aug. 2000, Proceedings of the sixth ACM SIGKDD international conference on Knowledge discovery and data mining, p. 280-284, <Retrieved from ACM on Jan. 21, 2009>.*
Heckerman, "Probabilistic Similarity Networks" Dissertation, Jun. 1990, Stanford University, Proquest UMI, 286 pages, <Retrieved from Proquest UMI Jan. 21, 2009>.*
Menon et al, "Lossless Image Compression with a Codebook of Block Scans", Jan. 1995, IEEE Journal on Selected Areas in Communications, p. 24-30, <Retrieved Jul. 17, 2008 from internet>.*
Chakrabarti et al, "Automatic Resource Compilation by Analyzing Hyperlink Structure and Associated Text", Apr. 1998, In Proceedings of the Seventh International World Wide Web Conference, p. 1-13, <Retrieved from CiteSeerX.ist.psu.edu on Jan. 25, 2009>.*
Lawrence et al, "Accessibility of information on the web", Jul. 1999, Nature Magazine, vol. 400, p. 107-109, <Retrieved from www.nature.com Jan. 25, 2009>.*
Hong et al, "Advances in Predictive Model Generation for Data Mining", Dec. 1999, IBM Research Report RC-21570, p. 1-18, <Retrieved from internet Jan. 25, 2009>.*
Medelzon et al, "What do the Neighbors Think? Computing Web Page Reputations". Dec. 2000, p. 1-8, <Retrieved from internet Jan. 25, 2009>.*
Lempel et al, "SALSA: The Stochastic Approach for Link-Structure Analysis", Apr. 2001, p. 131-160, <Retrieved from the internet Jan. 25, 2009>.*
Shakery et al, "Relevance Propagation for Topic Distillation UIUC TREC-2003 Web Track Experiments", Nov. 2003, TREC-2003, Text REtrieval Conference, Gaithersburg, MD, p. 1-5, <Retrieved from the internet Jan. 25, 2009>.*
Abonyi, Editor et al, "Computational Intelligence in Data Mining", May 2005, Informatica: An International Journal of Computing and Informatics, ISSN 0350-5596, 128 pages, <Retrieved from internet Jan. 25, 2009>.*

* cited by examiner

| | FEATURE (1) = BRAND "A" COOKIES | FEATURE (2) = BRAND "B" COOKIES | FEATURE (3) = BRAND "C" CHIPS | FEATURE (4) = BRAND "D" CRACKERS | ... | FEATURE (M) = BRAND "Y" PEANUTS |
|---|---|---|---|---|---|---|
| S(1) = CONSUMER (1) | X | | | | ... | |
| S(2) = CONSUMER (2) | X | x | | | ... | |
| S(3) = CONSUMER (3) | X | X | X | | ... | |
| S(4) = CONSUMER (4) | | | X | | ... | |
| S(5) = CONSUMER (5) | X | | | X | ... | X |
| S(6) = CONSUMER (6) | | X | X | | ... | X |
| S(7) = CONSUMER (7) | X | | | | ... | |
| ... | ... | ... | ... | ... | ... | ... |
| S(N) = CONSUMER (N) | | | | | ... | |

LARGE CONSUMER DATA SET 710

SYSTEM AND METHOD FOR PROCESSING A LARGE DATA SET USING A PREDICTION MODEL HAVING A FEATURE SELECTION CAPABILITY

TECHNICAL FIELD

The present invention relates in general to data processing of a large data set and more particularly to a system and a method for using a prediction model having a feature selection capability to process a fraction of the large data set, define useful features, and use those useful features to make predictions for the entire data set.

BACKGROUND OF THE INVENTION

Electronic data collection methods allow enterprises to collect and store large amounts of data about their customers. This is especially true in enterprises having a strong consumer focus, such as retail, financial, communications and marketing organizations. Data collected can be used by enterprises to better understand the needs, preferences and purchasing patterns of their customers.

For example, an electronic commerce (e-commerce) web site having around one-hundred million users may collect data on products that interest each user. User interest would be measured by noting whenever the user "clicked" on the product. The user and the products in which the user was interested would be collected and stored. If the e-commerce web site wanted to initiate an advertising campaign for a new product, the site could use the collected data to focus the campaign to that portion of its one-hundred million users that are likely to purchase the new product. Using the collected data to formulate this type of targeted marketing plan would make the advertisement campaign more efficient, effective and economical.

Data collected is stored in a large data set, and may be stored in a variety of formats. One such format is a two-dimensional (2-D) format using rows and columns. In this 2-D format, each row contains a sample and each column contains a variable or feature. In the above example, a sample may correspond to a user's identity and a feature corresponds to a product that was clicked on by the user. A large data set typically can contain billions of samples and millions of features. This means that a large data set easily can contain more than a terabyte ($10^{12}$ or one trillion bytes) of data.

Processing such a large amount of data can be difficult. Processing of the large data set is performed to extract information that can be useful to an enterprise. This useful information includes, for example, information about historical patterns and predictions about future trends. Processing extracts useful information from the large data set by discovering correlations or relationships between samples and features. A large data set contains too much data to be processed in its entirety by loading all the data into memory of an application, such as a database application.

One type of processing technique involves making predictions based on data in the large data set. In general, prediction processing techniques use a portion of the data to build a prediction model. A prediction model is a mathematical model that makes predictions based on correlations or relationships among features. After the prediction model is built, one sample at a time is loaded into the prediction model and processed to make a prediction of that sample.

One problem with these prediction processing techniques is that specialized computer code must be used to load each sample into the prediction model for processing. A database application cannot be used because the entire large data set far exceeds the memory capacity of the application. Because a conventional database application cannot be used, specialized computer code specific to the format of the data in the large data must be written to load each sample into the prediction model. This is often time consuming and difficult. These techniques frequently are used in research or academic environments by those who are capable and willing to write specialized computer code. In a business environment, however, it is a burdensome and expensive task for an enterprise to have to write computer code customized for its data set. Instead, an enterprise would prefer to have a prediction processing technique that requires no specialized skills or knowledge.

Accordingly, a need exists for a method and a system for processing a large data set that obtains predictions valid for the entire data set while using only a fraction of the entire data set.

SUMMARY OF THE INVENTION

The present invention includes a method and a system for processing a large data set using a prediction model having a feature selection capability. The feature selection capability is used to define useful predictors that are applicable to the entire data set. These useful predictors are used to obtain prediction results for the entire data set while requiring that only a portion of the data set be processed. A large data set may be defined as containing more data than can be conveniently loaded into a formal database application. For example, in the year 2002, the size of a large data set is approximately a terabyte or greater. However, it should be noted that as processing power changes according to Moore's law, the size defining a large data set will increase. The prediction model is a statistical model that makes predictions based on correlations and relationships among features contained in the data set.

The large data set processing method and system provides several advantages. First, by using the feature selection capability to define useful predictors, the quality of the features used to make a prediction can be controlled. In other words, only those features that most helpful and relevant to making a prediction can be used to process the data set. Second, the number of features used to make a prediction can be controlled. Using a small number of the most helpful and relevant features allows the amount of data needed for the prediction to be reduced dramatically. By controlling the quality and number of features used instead of using all of the features, a large data set may be processed faster and more efficiently while maintaining accuracy. Finally, reducing the amount of data needed to make a prediction about a large data set means that a fraction of the entire data set is used to make the prediction. This means that the data used to make the prediction can be loaded into a database application for processing against the feature-selection prediction model. This alleviates the need for specialized computer code.

The large data set processing method disclosed herein includes using a prediction model having a feature selection capability to process a large data set containing samples and features. The feature-selection prediction model is used to define useful predictors and to process a portion of the data set to obtain a prediction for the entire data set. In particular, one aspect of the invention involves defining useful predictors from the features by using the feature selection capability of the prediction model. Other aspects include ranking the useful predictors, such as according to their usefulness to the prediction. Once the useful predictors are defined, a portion of the data including each of the samples and the features defined as useful predictors are processed by the feature-selection prediction model to obtain prediction results valid for the entire data set. Some aspects of the large data set processing method include building a prediction model having feature selection by randomly selecting samples.

Another aspect involves processing a large data set having samples in rows and features in columns using the feature-selection prediction model. A first subset of the large data set is obtained by randomly selecting samples across all features. These randomly-selected samples are used to construct a prediction model having a feature selection capability. A desired prediction then is determined. The feature selection capability of the prediction model is used to define useful predictors from the selected features.

A second subset of the large data set is defined by applying the useful predictors data set. The second subset contains each of the samples but only data (columns) from those features defined as useful predictors. The second subset is processed by the feature-selection prediction model to obtain the desired prediction for each sample. Processing of the second subset yields a desired prediction that is valid of the entire data set. A target group containing samples meet the desired prediction are output from the feature-selection prediction model.

The large data set processing system includes a useful predictor module, for defining useful predictors, and a feature-selection prediction model, for processing a portion of the data set (including the useful predictors) to obtain prediction results. The useful predictor module uses the feature selection capability of the prediction model to define useful predictor from the features contained in the data set. These useful predictors, which generally are a fraction of the available features, are defined according to their relevance and usefulness in making the prediction. Output from the large data set processing system are prediction results that are valid for the entire data set. Some implementations of the large data set processing system include a construction module for building a prediction model having a feature selection capability.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION

In the following description of the large data set processing system and method, reference is made to the accompanying drawings, which form a part thereof, and in which is shown by way of illustration possible implementations. It should be noted that other implementations may be utilized and in some situations structural and operational changes may be made without departing from the method and system disclosed herein.

I. General Overview

The present invention includes a system and a method for processing large data sets containing an amount of data that cannot be conveniently loaded into a formal database application. The large data set processing system and method processes a fraction of the large data set at any given time yet obtains predictions valid for the entire data set. This is accomplished in part by using a prediction model having a feature selection capability. The feature-selection prediction model is a statistical model that makes predictions based on correlations and relationships within the data set. The feature selection capability allows the feature-selection prediction model to select and control the type and number of features used in the processing. Thus, the feature selection capability allows only those features most relevant and useful to making a prediction to be selected. In this manner, a fraction of the data set is processed rather than the entire data set. This allows the data contained in the large data set to be loaded into a database application for processing by the feature-selection prediction model and alleviates the need for a user to write specialized computer code to load the data directly into a prediction model.

II. System Overview and Exemplary Operating Environment

Figure 1:
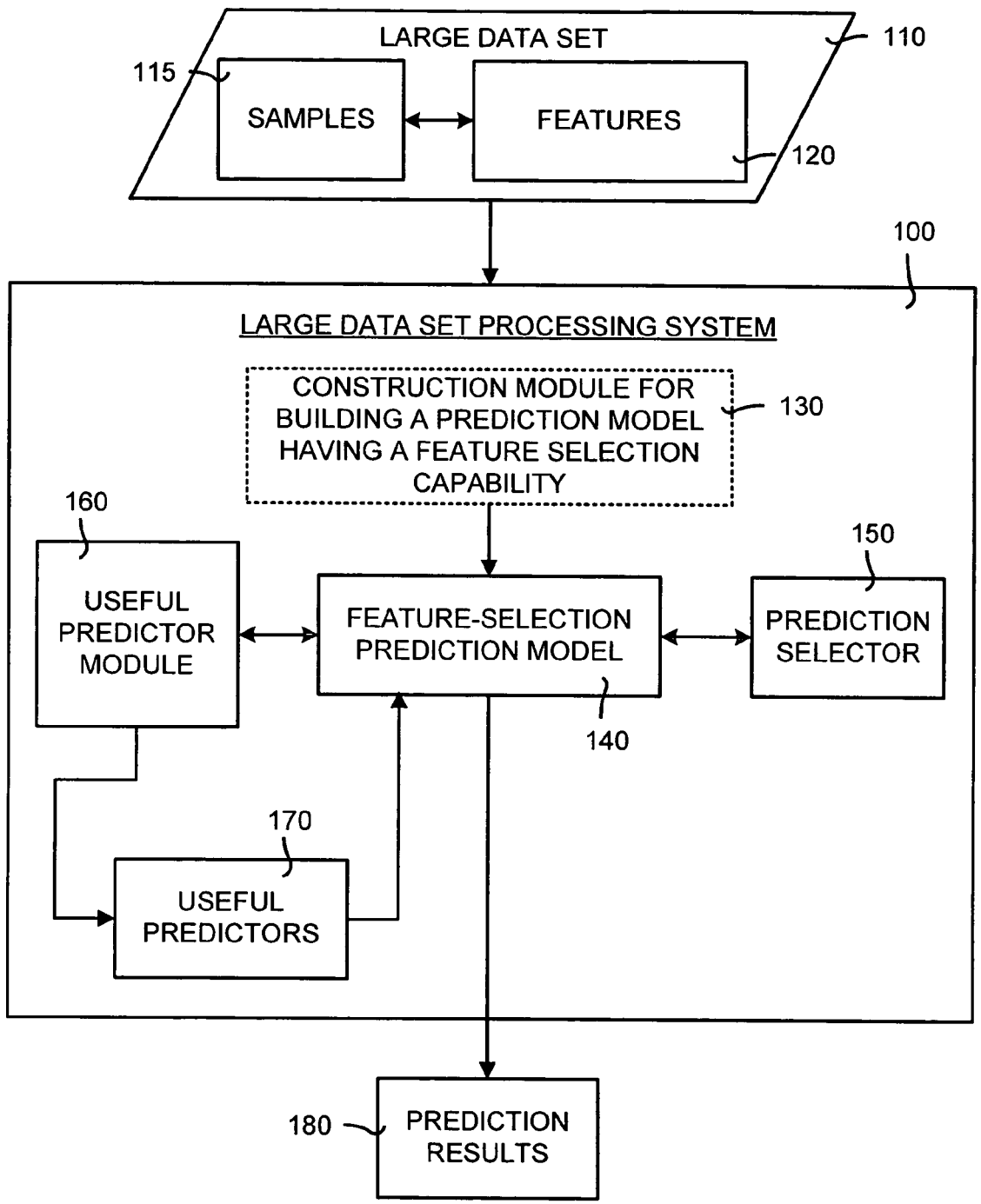
FIG. 1 is a block diagram illustrating the large data set processing system disclosed herein.

In general, the large data set processing system is used to process a large data set containing a large amount of data. In this specification, a large amount of data is defined generally as an amount of data that is too big to be conveniently loaded into a formal database application. The processing system allows predictions to be made about the entire data set while using only a small portion of the data set. FIG. 1 is a block diagram illustrating the large data set processing system 100 disclosed herein. In particular, the large data set processing system 100 is used to process a large data set 110. The large data set 110 contains samples 115 and features 120. By way of example, the samples 115 may be consumers and the features 120 may be products that the consumer has purchased. As noted above, the large data set 110 generally contains more data than can conveniently fit into a formal database application. By way of example, in the year 2002, the large data set 110 typically contains on the order of approximately 1 terabyte or greater of data. The number of samples 115 in the large data set 110 typically are on the order of billions while the number of features 120 typically are on the order of millions.

The large data set processing system 100 contains several components. A construction module 130 is used to build a prediction model having a feature selection capability 140. As shown in FIG. 1 by the dashed line, the construction module 130 is an optional module, as the feature-selection prediction model 140 may be constructed in advance. The feature-selection prediction model 140 is a statistical model that make a prediction based on input data. The feature selection capability of the feature-selection prediction model 140 allows selection and control over the quality and number of features used in prediction processing. One example of a feature-selection prediction model is a decision tree. Decision trees (and other feature-selection prediction models) are well known to those in the machine learning field and will not be discussed in detail.

A prediction selector 150 is used to provide the feature-selection prediction model 140 with a desired prediction. One technique is to have a user input into the prediction selector 150 the prediction that should be made. For example, the user may want the large data set processing system 100 to predict which consumers are most likely to buy a certain product based on the data in the large data set 110. Another technique is to have the prediction selector 150 randomly select a prediction, although typically this would not be done in practice.

A useful predictor module 160 is used in conjunction with the feature-selection prediction model 140 to define useful predictors 170 from the features 120. These useful predictors 170 are features that are particularly helpful or relevant in making the desired prediction. Useful predictors 170 are defined by the useful predictor module 160 and used by the feature-selection prediction model 140 to process the large data set 110 in accordance with the desired prediction. Once the useful predictors 170 have been defined from the features 120, the feature-selection prediction model 140 is used to process a portion of the large data set 110 to obtain results for all of the data contained in the large data set 110. In particular, all of the samples 115 and only those feature 120 defined as useful predictors 170 are loaded into a formal database application for processing by the feature-selection prediction model 140. Prediction results 180 containing the processed results of the large data set 110 against the desired prediction are sent as output from the large data set processing system 100.

The large data set processing system 100 is designed to operate in a computing environment. The follow discussion is intended to provide a brief, general description of a suitable computing environment in which the invention may be implemented.

Figure 2:
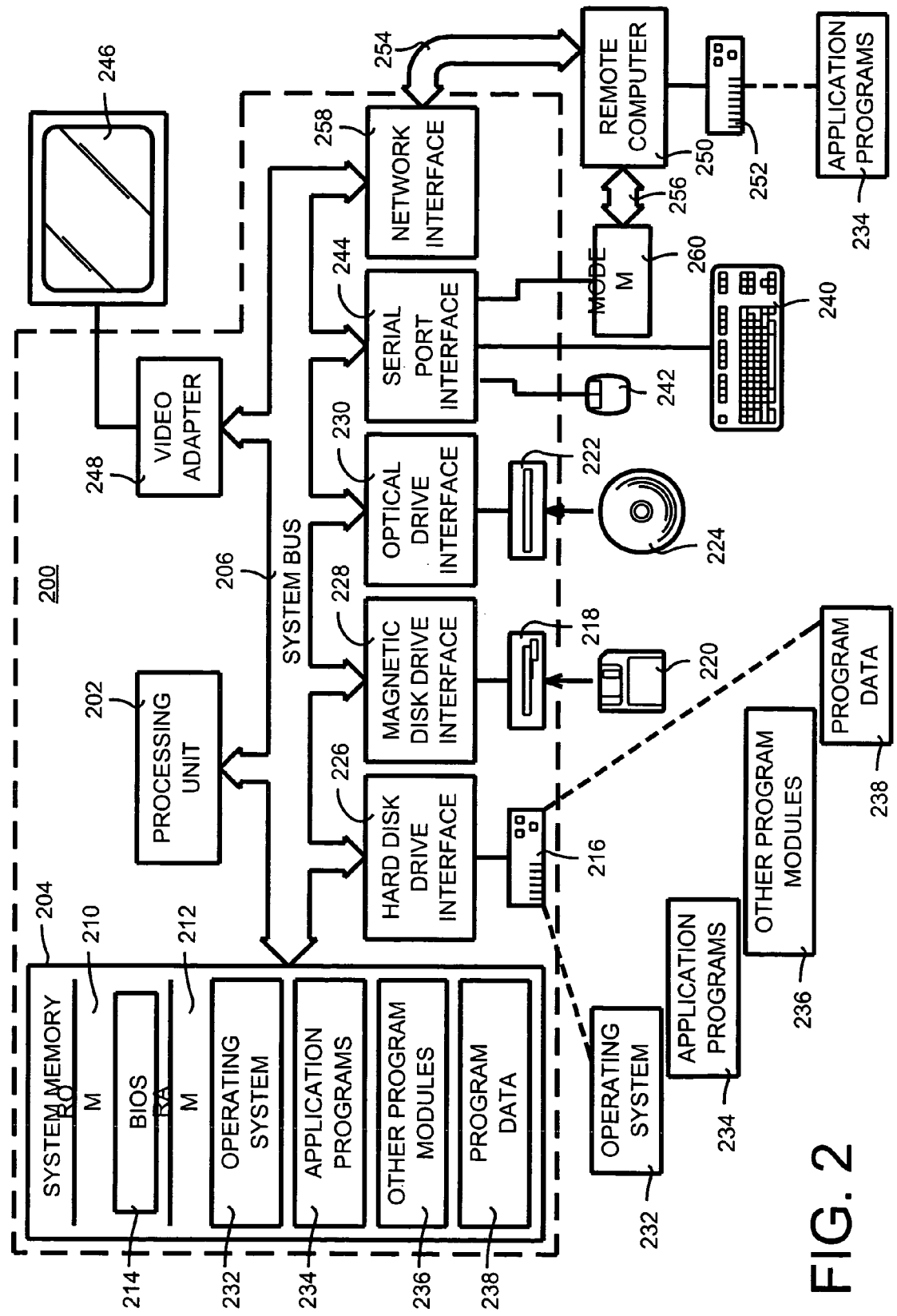
FIG. 2 is a block diagram illustrating a computing apparatus suitable for use with the large data set processing system shown in FIG. 1.

FIG. 2 is a block diagram illustrating a computing apparatus suitable for use with the large data set processing system shown in FIG. 1. Although not required, the invention is described in the general context of computer-executable instructions, such as program modules, being executed by a computer. For example, the useful predictor module 160 can be a program module including computer-executable instructions capable of being executed by a computer.

Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 2, an exemplary system for implementing the large data set processing system includes a general-purpose computing device in the form of a conventional personal computer 200. In particular, the computer 200 includes the processing unit 202, a system memory 204, and a system bus 206 that couples various system components including the system memory 204 to the processing unit 202. The system bus 206 may be any of several types of bus structures including a memory bus or memory controller, a peripheral bus, and a local bus using any of a variety of bus architectures. The system memory includes read only memory (ROM) 210 and random access memory (RAM) 212. A basic input/output system (BIOS) 214, containing the basic routines that help to transfer information between elements within the personal computer 200, such as during start-up, is stored in ROM 210. The personal computer 200 further includes a hard disk drive 216 for reading from and writing to a hard disk, not shown, a magnetic disk drive 218 for reading from or writing to a removable magnetic disk 220, and an optical disk drive 222 for reading from or writing to a removable optical disk 224 such as a CD-ROM or other optical media. The hard disk drive 216, magnetic disk drive 228 and optical disk drive 222 are connected to the system bus 206 by a hard disk drive interface 226, a magnetic disk drive interface 228 and an optical disk drive interface 230, respectively. The drives and their associated computer-readable media provide nonvolatile storage of computer readable instructions, data structures, program modules and other data for the personal computer 200.

Although the exemplary operating environment described herein employs a hard disk, a removable magnetic disk 220 and a removable optical disk 224, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk 216, magnetic disk 220, optical disk 224, ROM 210 or RAM 212, including an operating system 232, one or more application programs 234, other program modules 236 and program data 238. A user (not shown) may enter commands and information into the personal computer 200 through input devices such as a keyboard 240 and a pointing device 242. In addition, other input devices (not shown) including, for example, a microphone, joystick, game pad, satellite dish, scanner, or the like, may be connected to the personal computer 200. These other input devices are often connected to the processing unit 202 through a serial port interface 244 that is coupled to the system bus 206, but may be connected by other interfaces, such as a parallel port, a game port or a universal serial bus (USB). The monitor 246 (or other type of display device) is also connected to the system bus 206 via an interface, such as a video adapter 248. In addition to the monitor 246, personal computers typically include other peripheral output devices (not shown), such as speakers and printers.

The personal computer 200 may operate in a networked environment using logical connections to one or more remote computers, such as a remote computer 250. The remote computer 250 may be another personal computer, a server, a router, a network PC, a peer device or other common network node, and typically includes many or all of the elements described above relative to the personal computer 200, although only a memory storage device 252 has been illustrated in FIG. 2. The logical connections depicted in FIG. 2 include a local area network (LAN) 254 and a wide area network (WAN) 256. Such networking environments are commonplace in offices, enterprise-wide computer networks, intranets and the Internet.

When used in a LAN networking environment, the personal computer 200 is connected to the local network 254 through a network interface or adapter 258. When used in a WAN networking environment, the personal computer 200 typically includes a modem 260 or other means for establishing communications over the wide area network 256, such as the Internet. The modem 260, which may be internal or external, is connected to the system bus 206 via the serial port interface 244. In a networked environment, program modules depicted relative to the personal computer 200, or portions thereof, may be stored in the remote memory storage device 252. It will be appreciated that the network connections shown are exemplary and other means of establishing a communications link between the computers may be used.

III. Operational Overview

Figure 3:
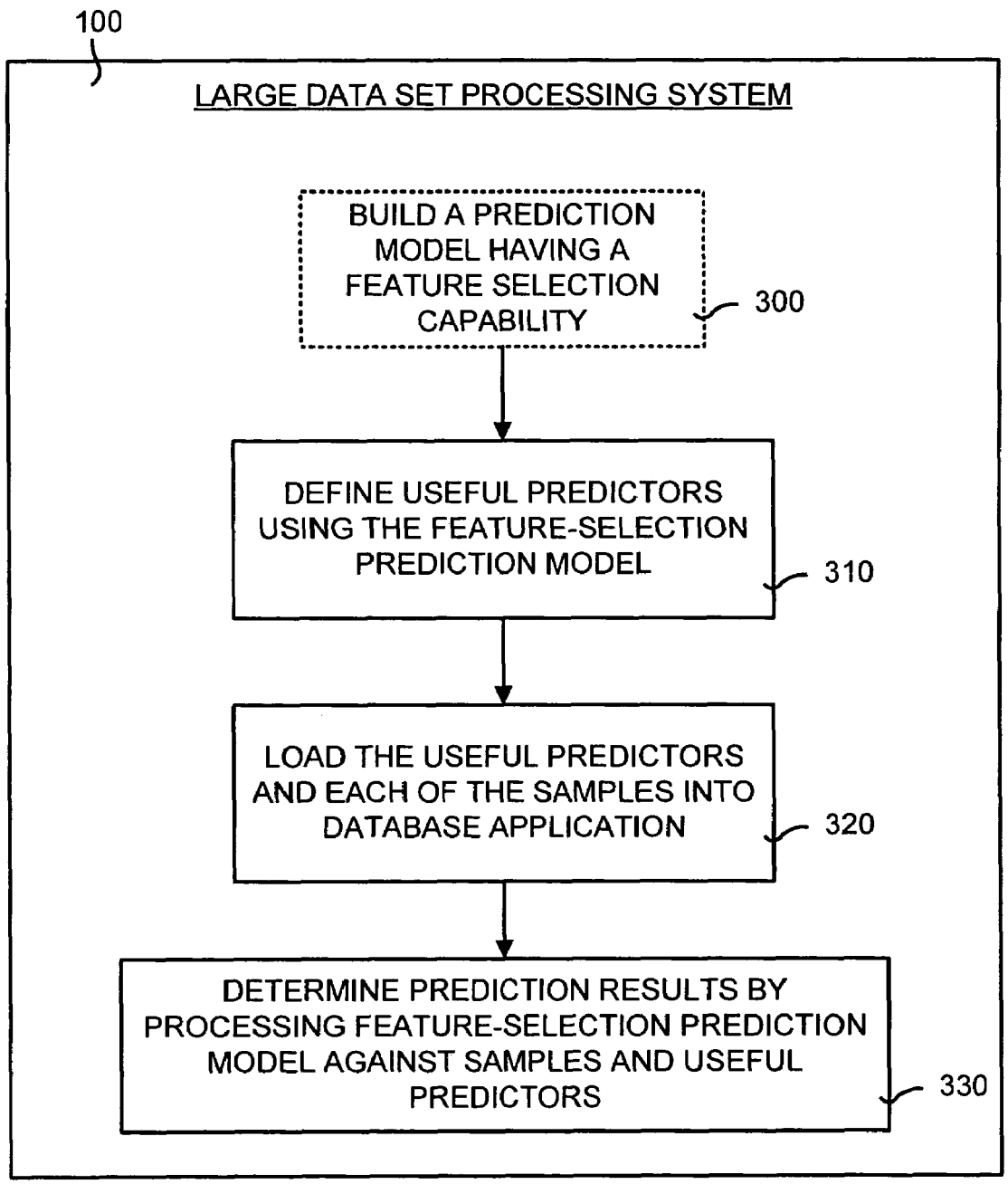
FIG. 3 is a general flow diagram illustrating the operation of the large data set processing system shown in FIG. 1.

FIG. 3 is a general flow diagram illustrating the operation of the large data set processing system 100 shown in FIG. 1. In general, the operation of the large data set processing system 100 includes using the feature-selection prediction model 140 to define useful predictors 170, loading the useful predictors 170 and samples 115 into the feature-selection prediction model 140, and processing a portion of the data set 110 to make the desired prediction for the entire data set 110. In particular, the feature-selection prediction model 140 is provided to the large data set processing system 100. As shown in FIG. 3, one technique is to build the prediction model having a feature selection capability 140 (box 300). The dashed lines around box 300 indicated that this operation is optional. The feature-selection prediction model 140 may already be available to the processing system 100.

Next, the feature selection capability of the feature-selection prediction model is 140 used to define useful predictors 170 (box 310). The feature-selection prediction model defines a portion of the features as useful predictors 170 based on how helpful each feature is in making the desired prediction. In other words, the useful predictors 170 are a portion of the features 120 from the large data set 110 that are particularly useful and relevant in making the desired prediction. Next, the useful predictors 170 and each of the samples 115 are loaded into a database application (box 320). Prediction results about the desired prediction then are determined by processing the feature-selection prediction model 140 against the data contained in the database application, namely, and the useful predictors 170 and each of the samples 115 (box 330). The prediction results are results of the desired prediction valid for the entire large data set 110. Thus, even though only a portion of the large data set 110 is processed by the feature-selection prediction model 140, the prediction results are valid for all of the data set 110.

Figure 4:
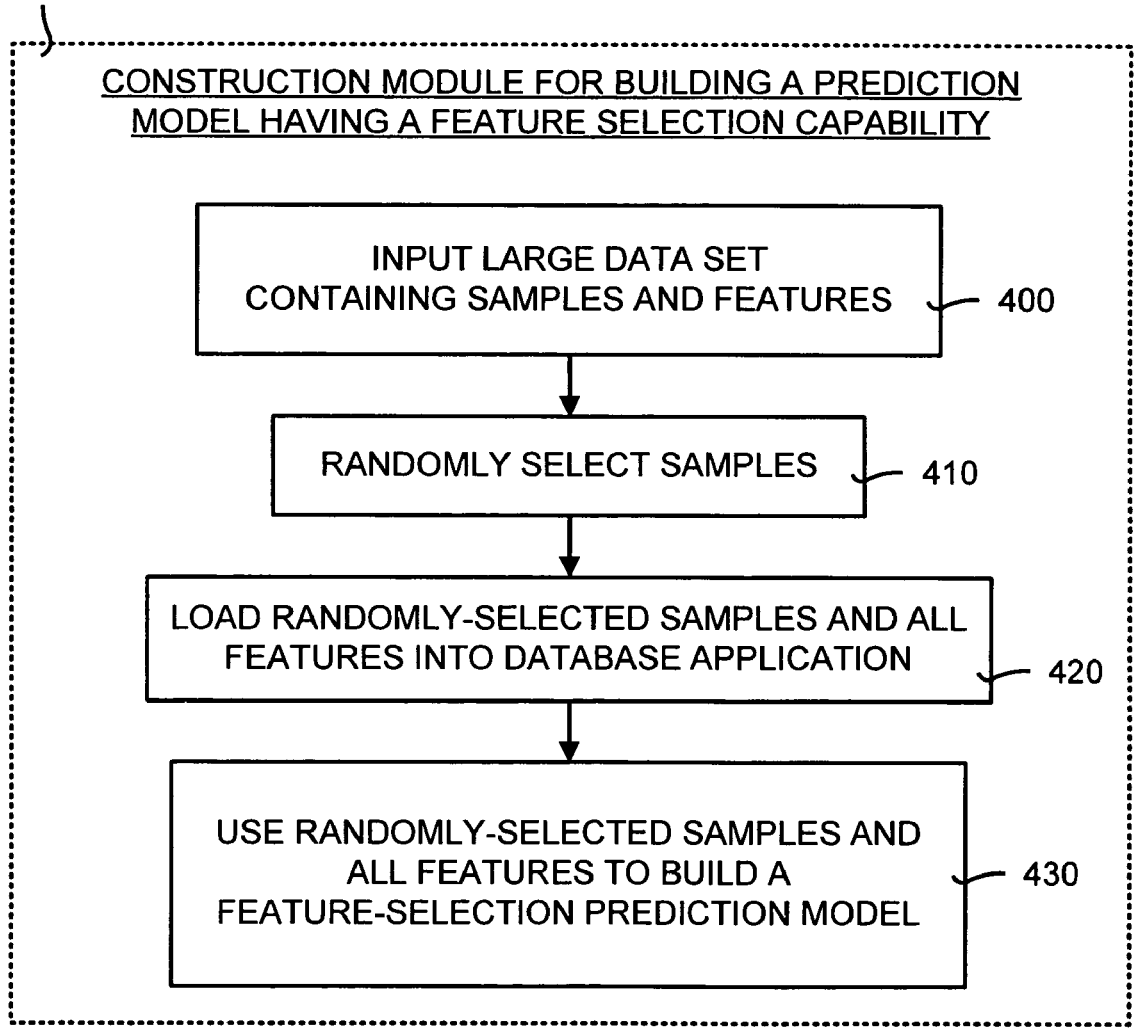
FIG. 4 is a flow diagram illustrating the operational details of the construction module shown in FIG. 1.

FIG. 4 is a flow diagram illustrating the operational details of the construction module 130 shown in FIG. 1. The construction module 130 is an optional module, as shown by the dashed line of FIGS. 1 and 4. Generally, the construction module 130 builds a prediction model having a feature selection capability by using a random selection of samples 115 from the large data set 110 and all of the features 120. Specifically, the construction module 130 first inputs the large data set 110 containing samples 115 and features 120 (box 400). A number of samples 115 are then randomly selected from the large data set 110 (box 410). The random selection of samples generally is a fraction of the samples. Several techniques may be used to select the number of randomly-selected samples, including selecting the number of samples such that the randomly-selected samples and all of the features can be loaded into a database application. Next, the randomly-selected samples and all of the features are loaded into a database application (box 420). In an alternate embodiment, the samples 115 of the large data set 110 are randomly selected as they are being loaded into the database application. These randomly-selected samples and each of the features 120 loaded into the database application then are used to build a feature-selection prediction model 140 (box 430).

Figure 5:
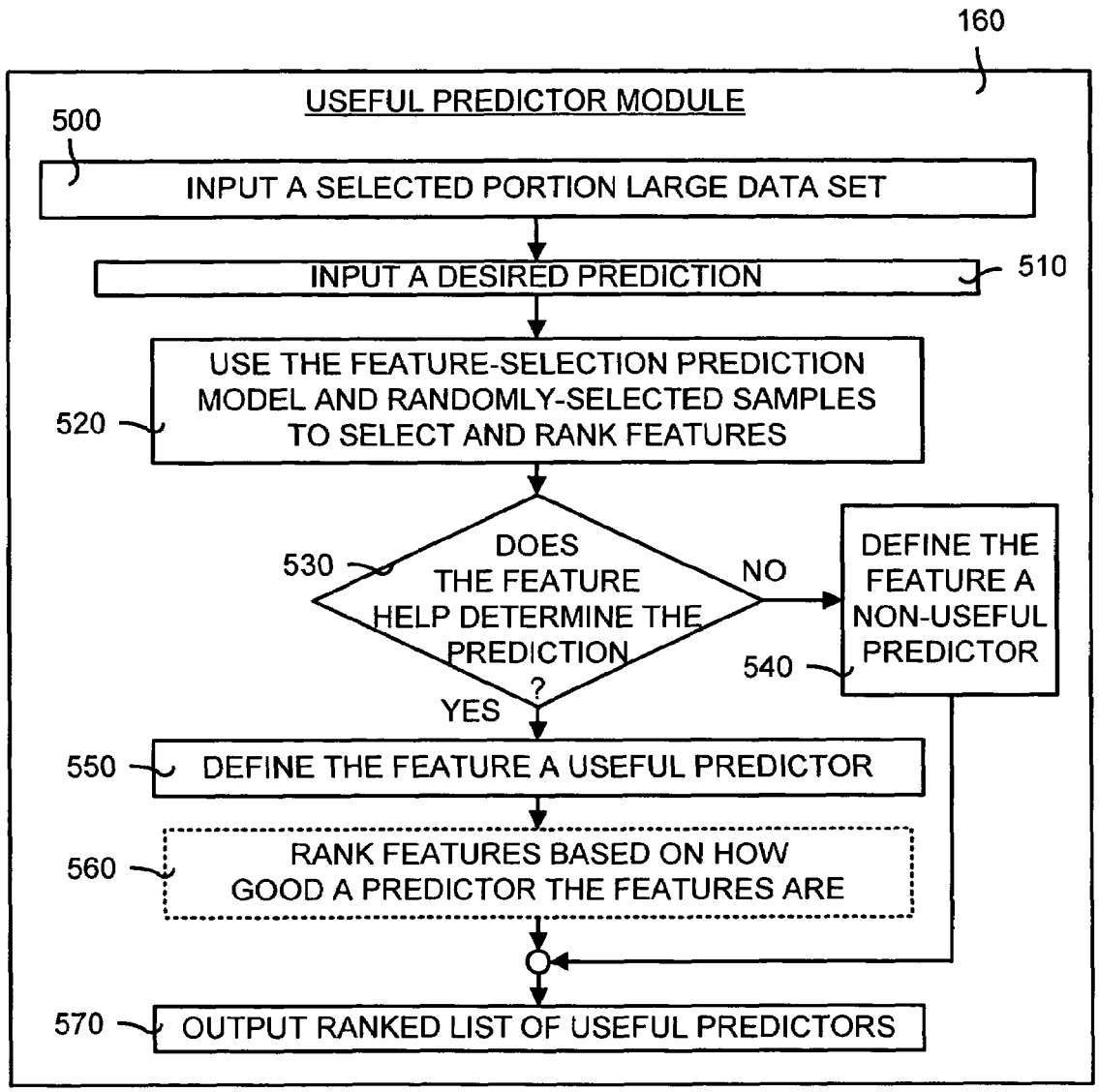
FIG. 5 is a flow diagram illustrating the operational details of the useful predictor module shown in FIG. 1.

FIG. 5 is a flow diagram illustrating the operational details of the useful predictor module 160 shown in FIG. 1. The useful predictor module 160 inputs a selected portion of the large data set 110 and outputs useful predictors 170. These useful predictors 170 are features that are defined as particularly useful and relevant to the desired prediction.

Specifically, the useful predictor module 160 begins by receiving a selection portion of the large data set 110 (box 500). The selected portion of the large data set 110 includes randomly-selected samples and each of the features. The number of samples randomly selected may be determined in a variety of ways. One technique involves selecting the number of samples such that the amount of data to be processed (namely, each of the features and the randomly-selected samples) fits into and allows manipulation by a database application. Another technique is to randomly select N samples, where N is some user-controlled constant (such as, for example, 20,000 samples). A desired prediction then is determined (box 510). This desired prediction is the prediction that the large data set processing system 100 will make about the large data set 110.

Next, the feature-selection prediction model 140 and randomly-selected samples are used to simultaneously define each of the features that are useful predictors (box 520). Defining feature as useful predictors is accomplished by making a determination about which features are useful and helpful in obtaining the desired prediction (box 530). If a feature is not useful, then that feature is defined as a non-useful predictor (box 540). On the other hand, if a feature is useful and relevant, that feature is defined as a useful predictor (box 550).

In one embodiment, each feature may be simultaneously ranked based on how well the feature aids in the desired prediction (box 560). For example, the features most relevant and useful in making the desired prediction are ranked at the top of a list while the features less relevant and useful are ranked at the bottom. This ranking of features is an optional operation, as denoted in FIG. 5 by the dashed lines. If the features are ranked, then a ranked list of useful predictors is sent as output (box 570). If the ranking operation is not performed, then the output is a list of useful predictors.

Figure 6:
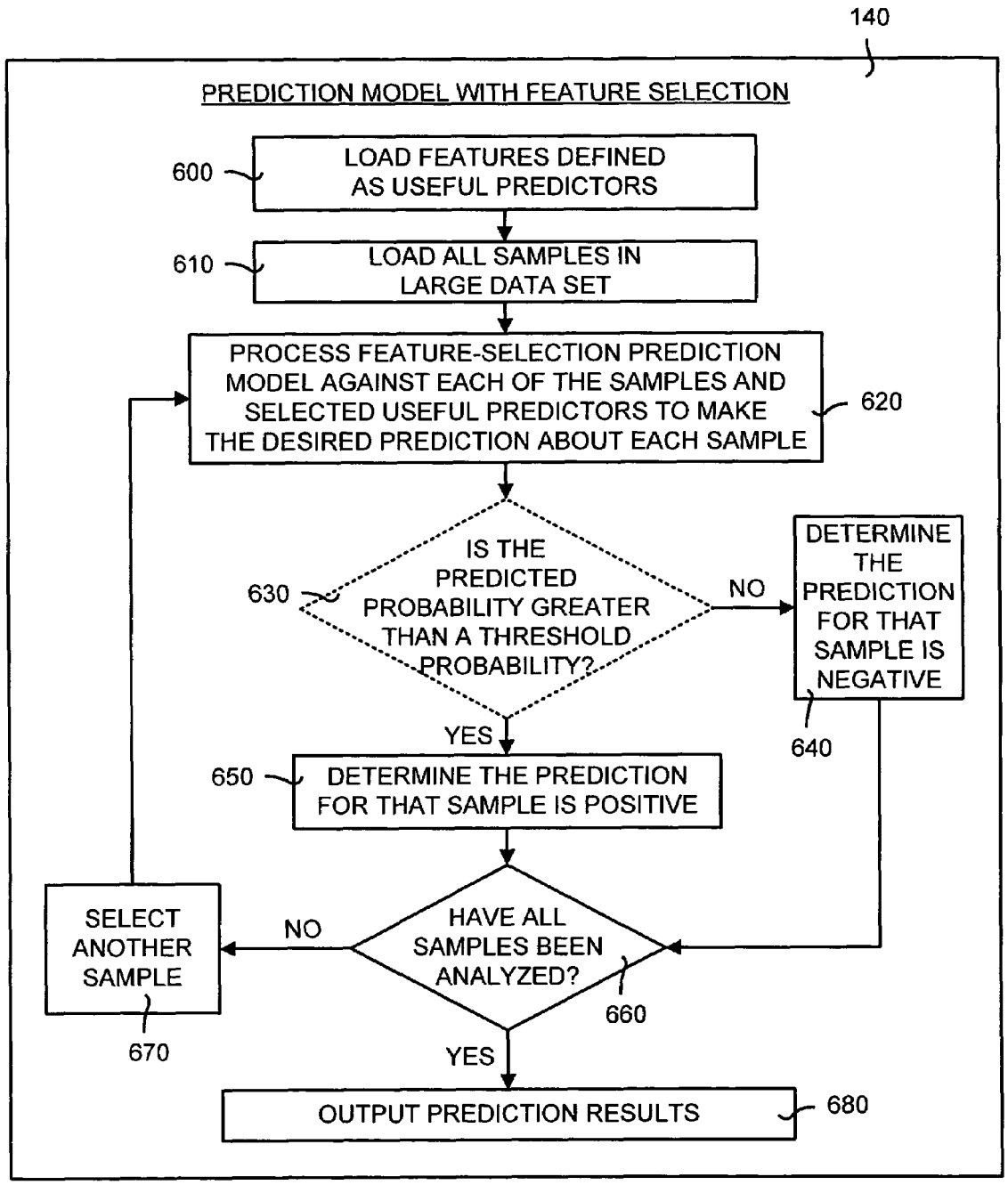
FIG. 6 is a flow diagram illustrating the operational details of the feature-selection prediction module shown in FIG. 1.

FIG. 6 is a flow diagram illustrating the operational details of the feature-selection prediction model 140 shown in FIG. 1. In general, the feature-selection prediction model 140 processes all of the samples 115 in the large data set 110 and only a portion of the features 120. The portion of the features 120 used are those features that are defined as useful predictors 170 or a portion thereof. These useful predictors 170 have been defined previously by using the feature-selection prediction model 140 in conjunction with the useful predictor module 160. Once the useful predictors 170 are defined, the feature-selection prediction model 140 is used to process those features defined as useful predictors and all of the samples.

The operation of the feature-selection prediction model 140 begins by loading those features defined as useful predictors (box 600). In one embodiment, these useful predictors are loaded into a database application. The database application determines in advance how many features it can load. This computation is done up front and the useful predictors can be loaded in one pass through the data.

Once the useful predictors are loaded, all of the samples 115 in the large data set 110 are loaded into the database application (box 610). The feature-selection prediction model 140 is then processed against the data loaded into the database application, namely, each of the samples 115 and those features defined as useful predictors (box 620). In this manner, the desired prediction is made about each sample by processing the feature-selection prediction model 140 against the data within the database application.

In one embodiment, a determination then is made whether a predicted probability is greater than a threshold probability (box 630). This operation is optional, as denoted by the dotted box shown in FIG. 6. If the probability is not greater than a threshold probability, then the determination is made that the prediction for that sample is negative (box 640). Otherwise, the determination is made that the prediction for the sample is positive (box 650). By way of example, if the desired prediction is to predict whether a customer will buy a product, a determination is made whether the probability that the customer will buy the product is greater than a threshold value. If so, then the prediction is positive: the customer is likely to buy the product. If not, then the prediction is negative: the customer is unlikely to buy the product. In another embodiment, a user may want to look at the distribution of probabilities produced across all samples before setting a threshold for final selection.

A determination then is made whether all of the samples have been analyzed (box 660). If not, then another sample is selected (box 670), and processed until all of the samples have been processed (box 620). Otherwise, prediction results are sent as output (box 680).

IV. Operational Details and Working Example

The operational details of the large data set processing system and method will now be illustrated using the following working example. It should be noted that this working example is provided as an example of one way in which the large data set processing system and method may be implemented.

Figure 7:
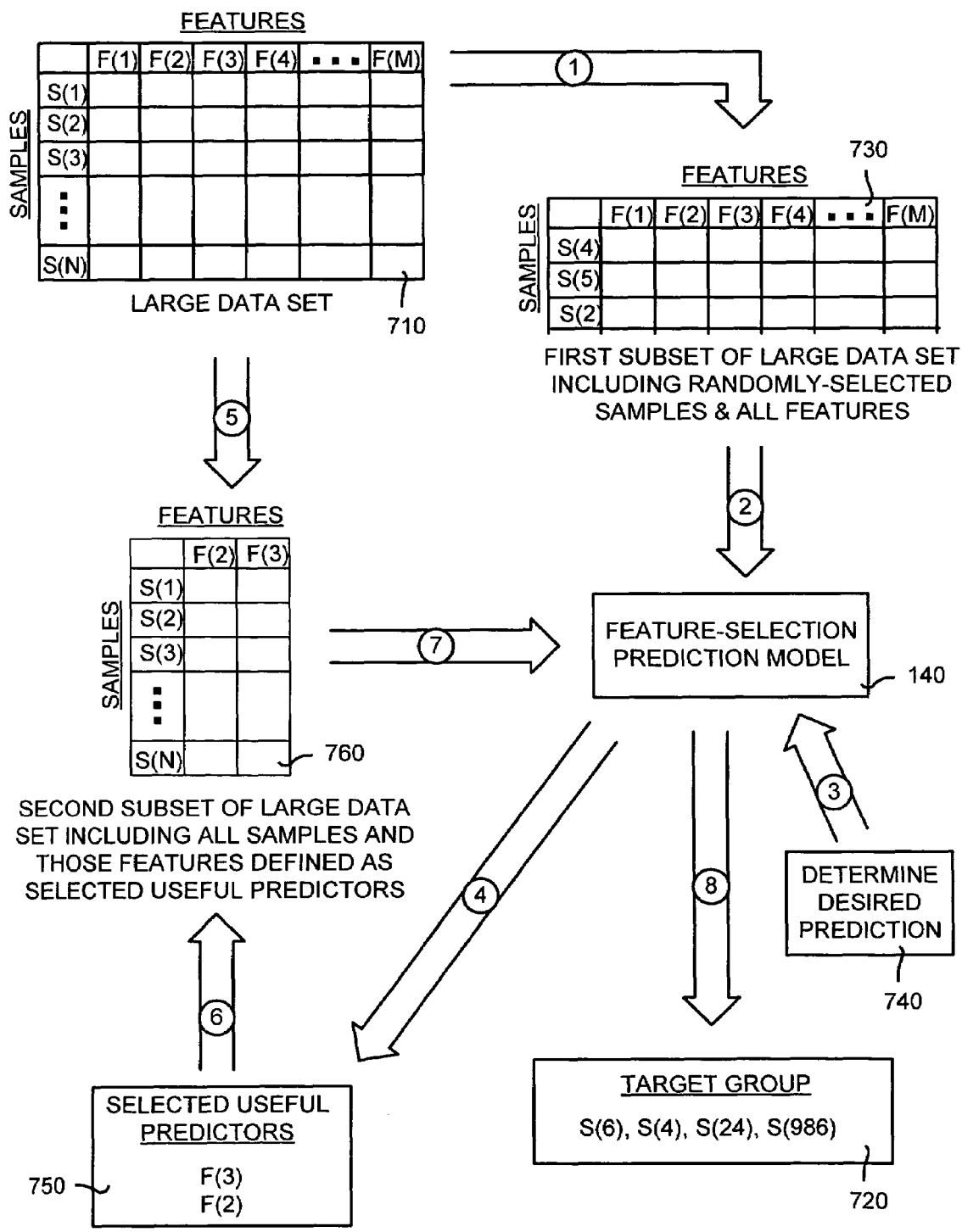
FIG. 7 is a block/flow diagram illustrating a working example of the large data set processing system and method and is shown for illustrative purposes only.

FIG. 7 is a block/flow diagram illustrating a working example of the large data set processing system and method and is shown for illustrative purposes only. In this implementation, a large data set 710 (which is an example of the large data set 110) was processed to determine a target group 720 (which is an example of the prediction results 180). The large data set 710 included a plurality of samples, S(1) to S(N), where N is on the order of $1 \times 10^9$, and features, F(1) to F(M), wherein M is on the order of $1 \times 10^6$. This large data set 710 was more than would conveniently fit into a formal database application. The processing of the large data set 710 included making a prediction about which of the samples should be included in the target group 720.

As shown by arrow 1, processing was initiated by obtaining a first subset 730 of the large data set 710. The first subset 730, which was a portion of the large data set 710, contains randomly-selected samples and all of the features. The first subset 730 was then loaded into a database application. In this working example, the sample were randomly selected while the data was being loaded into the database application.

Referring to FIG. 7, the first subset 730 contained randomly-selected samples S(4), S(1) and S(9), along with all of the features, F(1) to F(M). In this working example, the number of samples randomly selected was chosen to be three for ease of illustration. A larger number of samples that illustrated in this working example generally will be chosen. Different criteria may be used to determine the number of samples randomly selected. For example, the number of randomly-selected samples may be chosen to allow the first subset 730 to fit conveniently into a database application.

Next, as shown by arrow 2, the first subset 730 was used to build the feature-selection prediction model 140. The feature selection capability allows a user of the large data set processing system and method to select those features that are most important and relevant to the prediction being made. Thus, if the large data set 710 contains over one million features the feature selection capability of the feature-selection prediction model 140 allows the most relevant features to be used and the others discarded. The number of features that are selected can be determined by a user or by other means, such as automatically based on the available memory of the database application. Feature selection allows the important features to be selected, thereby significantly reducing the amount of data needing to be processed.

In this working example, the feature-selection prediction model 140 is a decision tree. Decision trees and other types of prediction models with feature selection capability are well known to those having ordinary skill in the art. Thus, the details of constructing such prediction models will not be discussed further.

Prior to processing, a desired prediction 740 was determined, as shown by arrow 3. In this working example, the desired prediction 740 was to predict which samples would likely be interested in a target product. Next, the feature selection capability of the feature-selection prediction model 140 was used to determine and select useful predictors 750, as shown by arrow 4. The selected useful predictors 750 in this working example included two features, F(3) and F(2). These two features were defined by the feature-selection prediction model 140 as having importance and relevance to the desired prediction 740. It should be noted that the selected useful predictors 750 can include any number of features. Ideally, however, selected useful predictors 750 includes those features most relevant to the desired prediction 740, which is typically a small fraction of all the features contained in the large data set 710.

A second subset 760 of the large data set 710 then was obtained, as shown by arrow 5. The second subset 760 contained all of the samples in the large data set 710 and only those features that were defined as useful predictors. In particular, the second subset 760 contained samples, S(1) to S(N), and those features that were defined and selected as useful predictors, namely, F(3) and F(2). Thus, the second subset 760 contains all of the rows and only the columns corresponding to the selected useful predictors.

The second subset 760 then was loaded into a database application. As shown by arrow 7, the second subset 760 was processed using the feature-selection prediction model 140.

In this working example, the feature-selection prediction model 140 processed the second subset 760 based on the desired prediction 740 to predict which samples were likely to be interested in the target product. The desired prediction was made for each of the samples in the large data set 710, namely S(1) to S(N). The samples that were predicted to be interested in the target product then were included in the target group 720, as shown by arrow 8. In this working example, it was determined that samples S(4), S(6), S(24) and S(986) should be included in the target group 720.

Figure 8A:
FIG. 8A illustrates the details of the large data set of FIG. 7 containing consumers and features.

FIGS. 8A-8E illustrate further details of the working example shown in FIG. 7. In particular, FIG. 8A illustrates that the samples S(1) to S(N) in the large data set 710 of FIG. 7 correspond to consumers(1) to consumers(N). Moreover, the features F(1) to F(M) in the large data set 710 of FIG. 7 correspond to snack food products. As stated above, the desired prediction 740 is to predict which of the consumers would be likely purchase the target product based on which snack food products the consumers have purchased previously. The consumers likely to purchase the target product then are included in the target group 720. As shown in FIG. 8A, an "X" in the box means that the consumer has purchased that product.

Figure 8B:
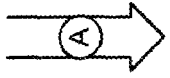
FIG. 8B illustrates the random selection of samples from the large data set shown in FIG. 8A to obtain a first subset used build a prediction model having a feature selection capability.
Figure 8B:
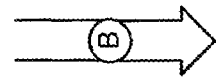

FIG. 8B illustrates the random selection of samples from the large data set 710 shown in FIG. 8A to obtain the first subset 730. The first subset 730 is used build a prediction model 140 having a feature selection capability. In this working example, consumer (2), consumer (4), and consumer (5) were randomly selected, as indicated in FIG. 8B by the shading. It should be noted that the first subset 730 was obtained by randomly selecting a portion of the rows and selecting all of the columns.

Figure 8C:
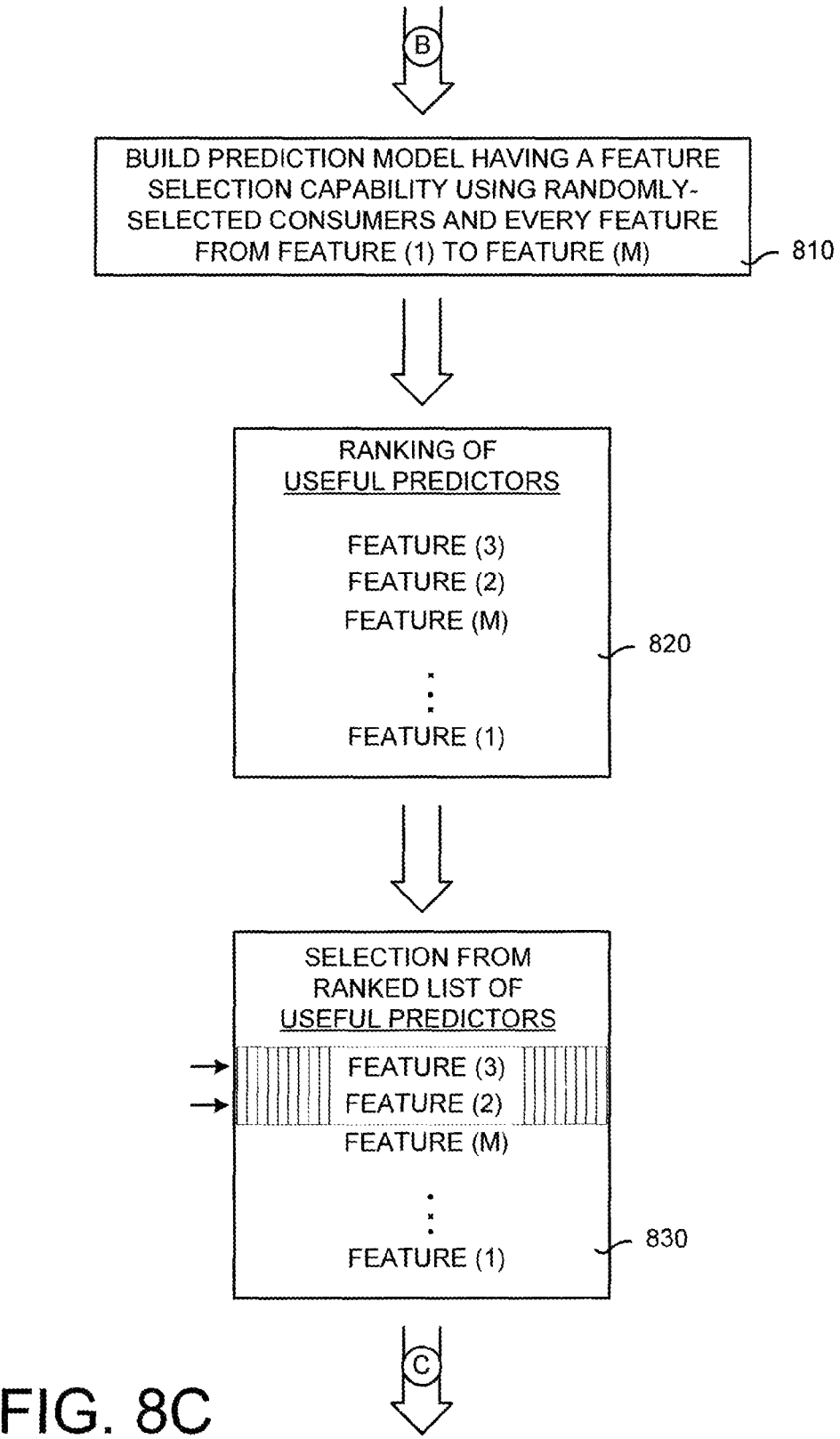
FIG. 8C illustrates the identifying and ranking of the set of useful predictors using the feature selection capability of the feature-selection prediction model.

FIG. 8C illustrates the identifying and ranking of the set of useful predictors 750 using the feature selection capability of the feature-selection prediction model 140. In particular, the first subset 730 was used to build the prediction model 140 having a feature selection capability (box 810). Next, the feature selection capability of the feature-selection prediction model 140 was used to process each feature and determine the usefulness of the feature in making the desired prediction 740. Based upon usefulness, each feature was ranked to obtain a ranked list of useful predictors (box 820). The desired number of useful predictors was selected and used to form the selected useful predictors 750. In this working example, two useful predictors were desired and feature (3) and feature (2) were selected because they were the top two ranking useful predictors (box 830).

Figure 8D:
FIG. 8D illustrates the formation of the second subset of the large data set by selection of all consumers and those features that are in the selected useful predictors.
Figure 8D:
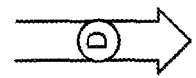

FIG. 8D illustrates the formation of the second subset 760 of the large data set 710 by selection of all of the consumers in the large consumer data set 710 and those features that are in the selected useful predictors list 750. In this working example, consumer (2) and consumer (3) were the selected useful predictors 750 and were the columns contained in the second subset 760. All of the rows, corresponding to all of the consumers (consumers (1) to consumers (N)) were contained in the second subset 760. Thus, the second subset 760 contains all rows and those columns corresponding to the selected useful predictors 750. The second subset 760 then was loaded into the database application.

Figure 8E:
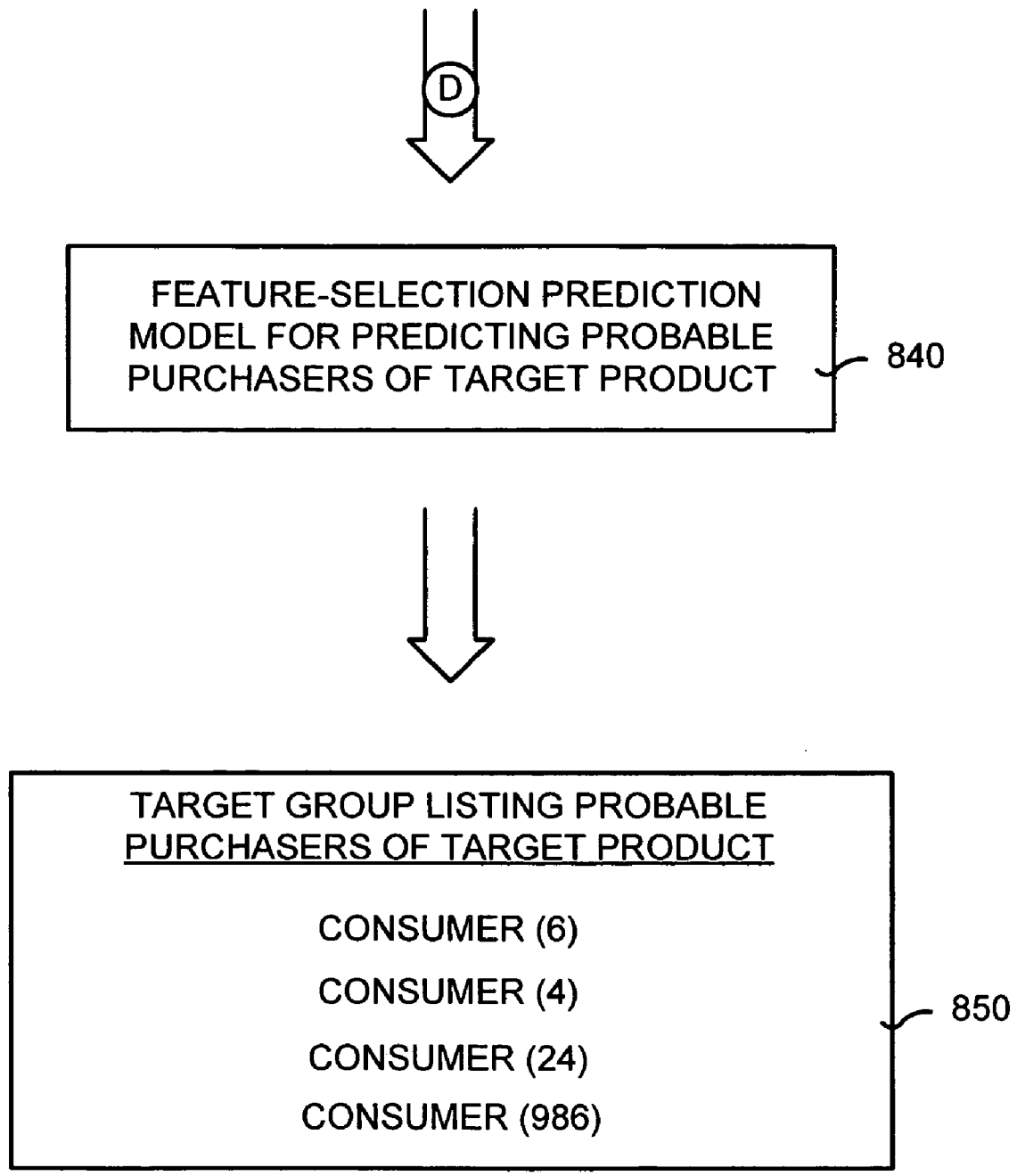
FIG. 8E illustrates the processing of the second subset by the feature-selection prediction model to obtain the target group.

FIG. 8E illustrates the processing of the feature-selection prediction model 140 against the second subset 760 contained in the database application. This processing yielded the target group 720. Processing occurred by making the desired prediction 740, namely, which consumers would be probable purchasers of the target product (box 840). Finally, a target group 720 was formed containing the consumers that were predicted to be interested in the target product (box 850). In this working example, consumers that were predicted to be probable purchasers of the target product and were included in the target group 720 were consumer (6), consumer (4), consumer (24), and consumer (986).

The foregoing description has been presented for the purposes of illustration and description. It is not intended to be exhaustive or limiting to the precise form and implementation disclosed. Many modifications and variations are possible in light of the above teaching. It is intended that the scope of the invention be limited not by this detailed description of the invention, but rather by the claims appended hereto.

What is claimed is:

1. A computer-implemented method for processing a data set containing samples and features, comprising using a computer to perform the following:
   a first loading step for loading a portion of the samples and each of the features into a database application;
   a building step for building a feature-selection prediction model using each of the features and a randomly-selected portion of the samples by randomly selecting the samples as they are being loaded in the database application;
   a definition step for defining useful predictors using the feature-selection prediction model, the useful predictors corresponding to a portion of the features;
   a second loading step for loading the useful predictors and each of the samples into a database application; and
   a processing step for determining prediction results by processing the feature-selection prediction model against all of the samples and the portion of the features corresponding to the useful predictors;
   wherein all of the samples and all of the features of the data set contain too much data to be processed in its entirety by loading all the data set into the database application simultaneously.

2. The computer-implemented method as set forth in claim 1, wherein the feature-selection prediction model is a decision tree.

3. The computer-implemented method as set forth in claim 1, further comprising a desired prediction step for obtaining a desired prediction for use by the feature-selection prediction model.

4. The computer-implemented method as set forth in claim 3, wherein the prediction results are results obtained from making the desired prediction about each of the samples.

5. The computer-implemented method as set forth in claim 3, wherein the definition step for defining useful predictors further comprises determining whether a feature is useful and relevant in determining the desired prediction.

6. The computer-implemented method as set forth in claim 5, wherein a feature is defined as a useful predictor if is useful and relevant in determining the desired prediction.

7. The computer-implemented method as set forth in claim 5, further comprising a ranking step for ranking each feature based how useful and relevant the feature is in determining the desired prediction.

8. The computer-implemented method as set forth in claim 3, further comprising a determination step for determining whether a predicted probability for the desired prediction is greater than a threshold probability.

9. The computer-implemented method as set forth in claim 8, wherein the determination step further comprises determining that the desired prediction is positive if the predicted probability greater than the threshold probability.

10. The computer-implemented method as set forth in claim 8, wherein the determination step further comprises determining that the desired prediction is negative if the predicted probability less than the threshold probability.

11. A computer-readable storage medium having stored and encoded thereon computer-executable instructions for processing a data set containing samples and features, comprising:
    loading a portion of the samples and each of the features into a database application;
    building a feature-selection prediction model using each of the features and a randomly-selected portion of the samples by randomly selecting N number of samples as they are being loaded in the database application, where N is a constant value that is controlled by the user;
    defining useful predictors using the feature-selection prediction model, the useful predictors corresponding to a portion of the features;
    loading the useful predictors and each of the samples into a database application; and
    determining prediction results by processing the feature-selection prediction model against all of the samples and the portion of the features corresponding to the useful predictors;
    wherein all of the samples and all of the features of the data set contain too much data to be processed in its entirety by loading all the data set into the database application simultaneously.

12. The computer-readable storage medium of claim 11, wherein the feature-selection prediction model is a decision tree.

13. The computer-readable storage medium of claim 11, further comprising obtaining a desired prediction for use by the feature-selection prediction model.

14. The computer-readable storage medium of claim 13, wherein the prediction results are results obtained from making the desired prediction about each of the samples.

15. The computer-readable storage medium of claim 13, wherein defining useful predictors further comprises determining whether a feature is useful and relevant in determining the desired prediction.

16. The computer-readable storage medium of claim 15, wherein a feature is defined as a useful predictor if is useful and relevant in determining the desired prediction.

17. The computer-readable storage medium of claim 15, further comprising ranking each feature based how useful and relevant the feature is in determining the desired prediction.

18. A data set processing system for processing a data set containing samples and features, comprising:
    a data set containing sample and features and having a portion of the samples and each of the features loaded into a database application;
    a general purpose computing device;
    a computer program comprising program modules executable by the computing device, the computer program further comprising:
        a construction module that builds a feature-selection prediction model using all of the features and a randomly-selected portion of the samples by randomly selecting the samples as they are being loaded in the database application;
        a useful predictor module that defines useful predictors using the feature-selection prediction model, the useful predictors corresponding to a portion of the features;
        useful predictors are loaded along with each of the samples into the database application; and
        a prediction selector that determines prediction results by processing the feature-selection prediction model against all of the samples and the portion of the features corresponding to the useful predictors;
    wherein all of the samples and all of the features of the data set contain too much data to be processed in its entirety by loading all the data set into the database application simultaneously.

19. The data set processing system of claim 18, further comprising a desired prediction that is used by the feature-selection prediction model.

20. The data set processing system of claim 19, further comprising a prediction results about the desired prediction obtained by processing the feature-selection prediction model against the useful predictors and each of the samples, wherein the prediction results are valid for the entire data set.

* * * * *